United States Patent [19]
Mandel

[11] Patent Number: 6,058,959
[45] Date of Patent: May 9, 2000

[54] AUTOMATIC SHUTOFF AND MANUAL RESET VALVE

[76] Inventor: George Mandel, 1930 W. Winton Ave., Units 3, 4, & 5, Hayward, Calif. 94545

[21] Appl. No.: 09/205,832

[22] Filed: Dec. 3, 1998

Related U.S. Application Data

[63] Continuation-in-part of application No. 08/754,181, Nov. 19, 1996, abandoned.
[51] Int. Cl.[7] .................................................. F16K 17/36
[52] U.S. Cl. ................................ 137/38; 137/39; 137/45
[58] Field of Search .................................. 137/38, 39, 45

[56] References Cited

U.S. PATENT DOCUMENTS 4,960,145  10/1990  Schlotzhauer .............................. 137/38

Primary Examiner—Gerald A. Michalsky
Attorney, Agent, or Firm—Richard Esty Peterson

[57] ABSTRACT

A resettable earthquake valve for gas lines, the valve having a housing with an external turn cock and an internal valve sleeve with a port that functions as a stopcock valve, the housing having an internal passage with a port and a closure biased valve disk displaceable from the port by a support member having an inertial mass, the support member being debilitated by a shock to the valve, the support member being connected to the biased valve disk at one end and engageable by a displaceable support base at the other, the valve having a cam mechanism for resetting the support member after being debilitated, for returning the support member to its support position displacing the valve disk from the valve port on resetting the valve.

20 Claims, 4 Drawing Sheets

AUTOMATIC SHUTOFF AND MANUAL RESET VALVE

This is a continuation-in-part to my application of the same title application Ser. No. 08/754,181 filed Nov. 19, 1996, now abandoned.

BACKGROUND OF THE INVENTION

This invention relates to a resettable earthquake valve for the gas service to a dwelling or other gas supplied structure or device. The valve is an automatic shutoff valve actuated by motion and may have application in other gas or fluid-line environments where a mechanical, automatic shutoff valve that is easily reset is desired. For purposes of this application, the common application of a natural gas shutoff is described to define the attributes of this valve.

Many areas of the world are subject to earthquakes and a simple, automatic shutoff valve for the main gas supply to a dwelling or other structure is a desirable safety device to prevent gas leaks from causing fire or explosion. However, many current designs, such as those based on the ball and pedestal are difficult to reset with certainty or without the potential for leakage. Following a severe earthquake, widespread damage may require rapid reset of undamaged systems for expediting general relief and a return to normal conditions. Widespread use of safety valves may impede return to service where the valves require a trained technician for reset.

It is a primary object of this invention to provide a quick resettable earthquake valve to facilitate return to normal service.

It is also an object of this invention to provide an automatic, motion-responsive, shutoff valve, that is easily reset with common tools.

It is also an object of this invention to provide an automatic shut-off feature into a conventional-type stopcock valve for gas flow.

It is a further object to construct mechanical shutoff and reset valve that is inexpensive to manufacture, and utilizes mechanical actuator components.

These and other advantages of the invented earthquake valve are apparent from the description of the features and components of the valve in the brief summary and detailed description of the preferred embodiment.

SUMMARY OF THE INVENTION

The automatic shutoff and manual reset valve of this invention is primarily designed to automatically close natural gas supply valves in the event of an earthquake. The invented valve has widespread utility for shutting off the main gas supply to dwellings and business structures at the onset of an earthquake to prevent release of gas within the structure in the event there is damage to the gas lines or connectors inside the structure. The automatic shut-off valve of this invention is incorporated in a conventional stopcock valve allowing manual shutoff to the line as desired.

The automatic shutoff and manual reset valve is also useful as a motion actuated valve for equipment where it is desirable to close natural gas or other gaseous fluid lines as a result of lateral motion or shock.

The automatic shut-off feature of the valve is constructed similar to a globe valve where the service pressure assists in maintaining the closure disk of the valve in the closed position when automatically triggered. The spring biased closure is restrained by a trigger mechanism positioned on the opposite side of the disk from the bias spring. In each embodiment the trigger mechanism has a prop that holds the valve disk in an open position until debilitated or tripped by action of an inertial mass.

In a first embodiment, the trigger mechanism is a flexible post that is preferably constructed as a tightly-wound, helical tension spring with an attached inertial mass. The support spring when placed in compression provides a stable support until a transverse force at the central portion of the spring post bends the compressed tension spring, debilitating the post under force of the disk bias spring. The transverse force is generated by the inertial effect of the inertial mass attached to the spring post during sudden lateral motion of the valve. By proper selection of the support spring for the post and compression spring for the disk bias, the valve can be designed for automatic actuation at a desired threshold of motion. Notably, this threshold of actuation may be different for variations in the environment of use. Different thresholds can be easily accommodated by substitution of stiffer or more flexible support springs with a compatible compression spring.

The spring post butts the valve closure disk at one end and is supported by a cam operated pedestal mechanism at the opposite end. The cam operated lift mechanism has a rotatable cam member connected to a wrench operated turn cock for reset by extending the collapsed post to alignment and urging the aligned spring post against the spring biased closure disk. This is performed externally by rotation of the turn cock at the top of the motion valve, which is integral with a cam containing cuff that engages a cross bar in the lift mechanism.

In another embodiment, a pendulum with a similar inertial mass supported on, but not secured to the lift mechanism is used. A lateral motion on the valve will tend to displace the pendulum weight from the pedestal. Proper selection of the compression spring for the closure disk, which transmits the spring force to the pendulum contact on the pedestal, will determine the degree of lateral shock required to overcome the frictional contact of the pendulum on the pedestal and debilitate the pendulum as a support member for the closure disk.

In a third embodiment, a pendulum with an inertial mass is suspended from the valve closure disk on a rod that is engaged by a trip mechanism. The lift mechanism holds the rod and hence the valve closure disk in an elevated position until a shock to the valve triggers a release of the trip mechanism and closure of the valve disk. The pedestal mechanism in this embodiment is in the form of a lift pad, which lifts the pendulum and connected valve disk to a set position and is then returned to a lowered position displaced from the weight until the valve is triggered. In this embodiment the trip mechanism and not the lift mechanism holds the valve disk in the open position by support of the pendulum. As in the prior embodiments the automatic shut-off and manual reset valve is externally reset by rotation of a turn cock at the top of the valve. The lift mechanism is utilized to lift the pendulum and connected valve disk to an elevated position where the trip mechanism again engages and holds the rod which props the disk in the open position.

As noted, the automatic shut-off mechanism is incorporated in a valve unit that provides for a conventional manual shutoff by a stopcock valve mechanism.

DETAILED DESCRIPTION OF THE PREFERRED EMBODIMENTS

Figure 1:
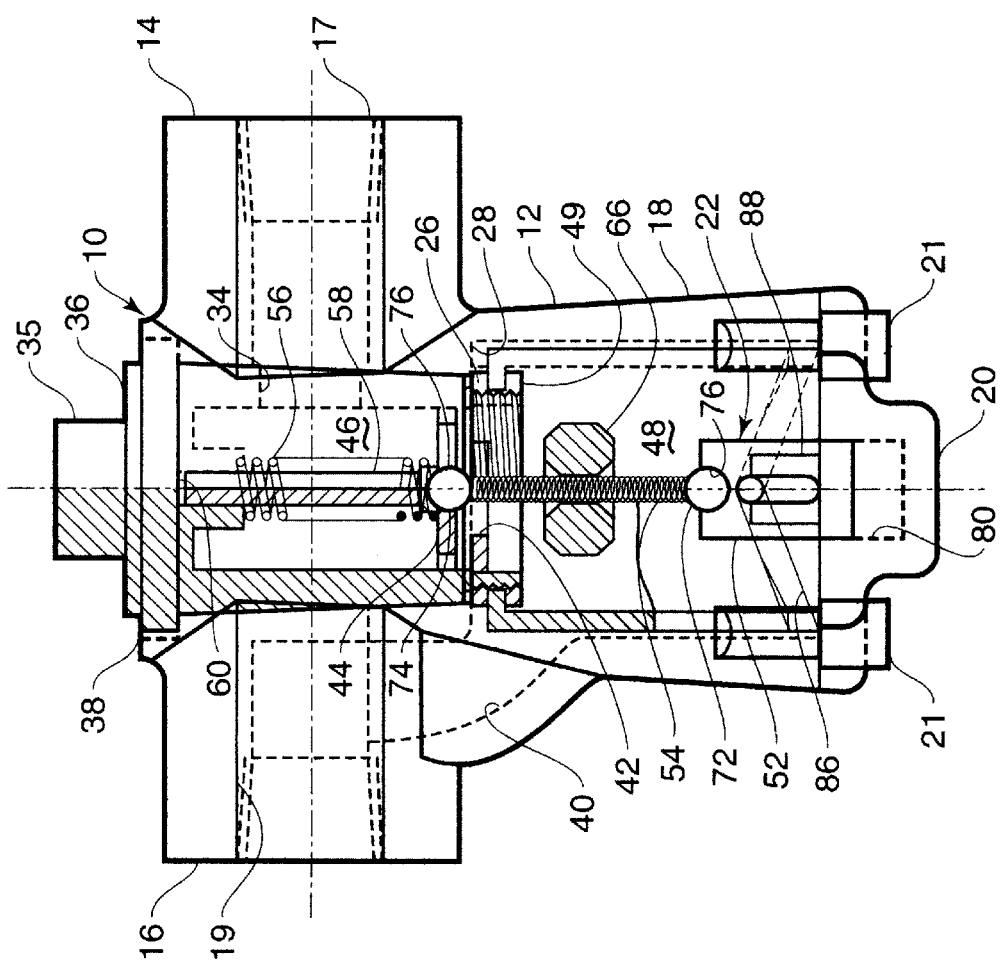
FIG. 1 is a cross sectional, side view of the resettable earthquake valve of this invention.

Referring to the partial, cross-sectional view of FIG. 1, the resettable earthquake valve of this invention is shown and designated generally by the reference numeral 10. The resettable earthquake valve is a motion-activated valve that may be used in any environment where a mechanical, motion sensitive, shutoff valve is required. It is contemplated that widespread use of such a motion valve is intended in the setting of a gas line, shutoff valve for the gas supply to dwellings and buildings for earthquake protection. The motion valve 10 is scalable and may be sized for common gas supply lines of three quarter inch and greater. Smaller sizes may be utilized for equipment shutoff and other environments.

The motion valve 10 has a cast housing 12 with conventional pipe connectors 14 and 16 for connecting the motion valve to a gas service line. The connectors 14 and 16 provide an intake passage 17 and an exit passage 19 for fluid passage through the valve. The housing 12 also includes a bell portion 18 with a bell cap 20 that is joined to the bell portion of the housing by bolts 21 to house the mechanical actuation and reset mechanism 22 for the earthquake valve 10. The actuation and reset mechanism 22 is retained in the motion valve housing 12 by a threaded ring nut 26 that engages the end 24 of a tapered sleeve 32 that seals the actuator mechanism 22 within the housing 12 of the earthquake valve 10. The threaded ring nut 26 seats against a portion 28 of the housing 12 and retains the tapered sleeve 32 in place allowing the sleeve 32 to be axially pivoted.

The tapered sleeve 32 is in the configuration of a truncated cone with a side port 34 facing the connector 14 for the fluid intake. The conical configuration allows a wedge-fit to the housing 12 under force of the threaded ring nut 26 to insure a fluid seal. In this manner, the sleeve is axially rotatable by application of torque on the turn cock 35 on a cap 36. The side port 34 in the tapered sleeve 32 is rotated away from the intake passage 17, effectively sealing the internal mechanisms from the fluid supply. The valve 10 is functional as a conventional stopcock valve to close on rotation of the turn cock 35 whether or not the automatic valve mechanism has been triggered.

The cap 36 is seated in a recess 38 and is unitary with the sleeve 32. The sleeve 32 has an internal constricted valve port 42 that co-operates with a valve disk 44 to seal an internal passageway 46 from the inlet connector 14 through the tapered sleeve 32 to a chamber 48 within the bell portion of the housing 12, and finally through a connecting passageway 40 to the exit connector 16. Secured to the sleeve 32 by a second ring nut 49 is a cam cuff 50 that extends into the bell chamber 48 and connects to a cam operated, lift mechanism 52 that engages a support member in the form of a support spring 54 that is a tightly wound tension spring placed in compression and used as a support prop for displacing the valve disk 44 from the valve port 42. The valve disk 44 is biassed towards closure by a compression spring 56 that contacts both the valve disk 44 and the underside of the cap 36. The spring 56 encompasses a valve stem 58 connected to the disk and seated for displacement in a socket 60 in the underside of the cap 36.

Centrally located on the support spring 54 is a collar-like weight 66 that provides an inertial mass for triggering the automatic closure of the valve upon sudden motion of the valve. During any lateral motion of the valve, the acceleration causes an inertial effect upon the weight 66 which translates as a lateral force against the support spring 54. Since the support spring 54 is bendable, the support spring 54 collapses against the axial force of the compression spring 56, causing the valve disk 44 to displace to a closure position, blocking the valve opening 42. In addition to the force of the compression spring 56, the pressure of the incoming gas is applied against the back of the valve disk 44 increasing the force of closure.

Figure 2:
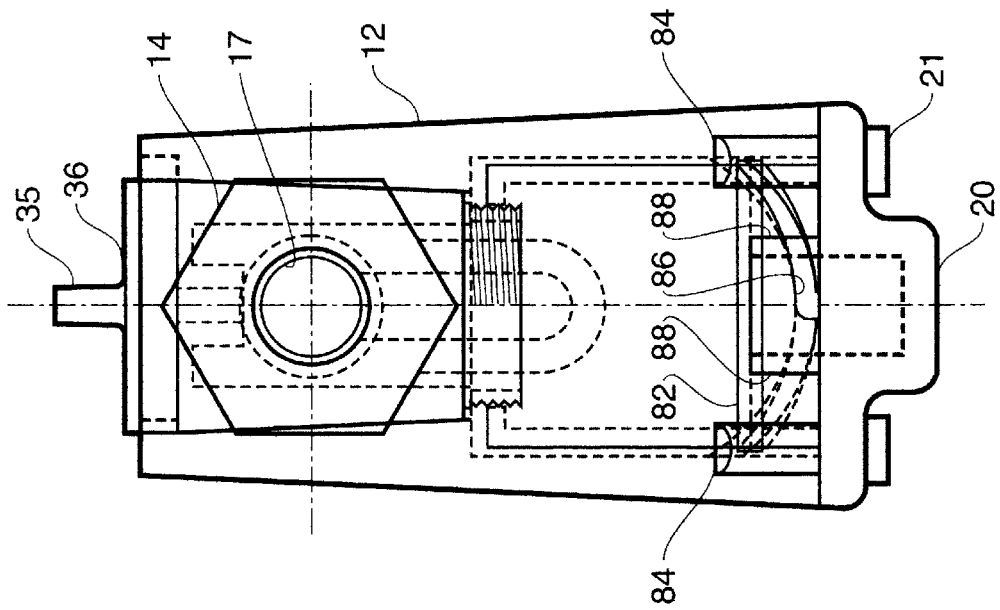
FIG. 2 is an end view, partially in cross section of the earthquake valve of FIG. 1.

Referring to FIGS. 1 and 2, the cam-operated, lift mechanism 52 connects to the support spring 54 by a ball socket 70 that engages a ball 72 fixed to the end of the spring 54. A similar ball socket 74 in the valve disk 44 engages a ball 76 at the other end of the spring 54 and allows the support spring 54 to collapse in any direction with the ball and socket forming a ball joint for unidirectional limited pivot.

The lift mechanism 52 includes a displaceable, support base in the form of a support piston 78 seated in a recess 80 in the bell cap 20. A cross bar 82 passes through the support piston 78 and has distal ends 84 that engage opposed incline cam slots 86 in the cam cuff 50. To prevent rotation of the support piston 78 when the cam cuff 50 is rotated, a pair of guide brackets 88 are mounted on the bell cap 20 on each side of the recess 80 to rotationally restrain the cross bar 82.

As the tapered sleeve 32 is rotated a quarter turn by application of torque to the turn cock 35, the connected cam cuff 50 also pivots. The cam cuff 50 engages the ends 84 of the cross bar 82 in the cam slots 86 and lowers the piston 78 in the recess 80. The displacement of the support piston 78 is sufficient to straighten the support spring 54 while the valve disk 44 remains seated closing the valve opening 42. When the turn cock 35 is rotated back to the original position, the cam cuff 50 pivots accordingly and raises the cross bar 82 and support piston 78. The straightened support spring 54 in turn raises the valve disk 44 to its open position and the valve is in service.

Figure 3:
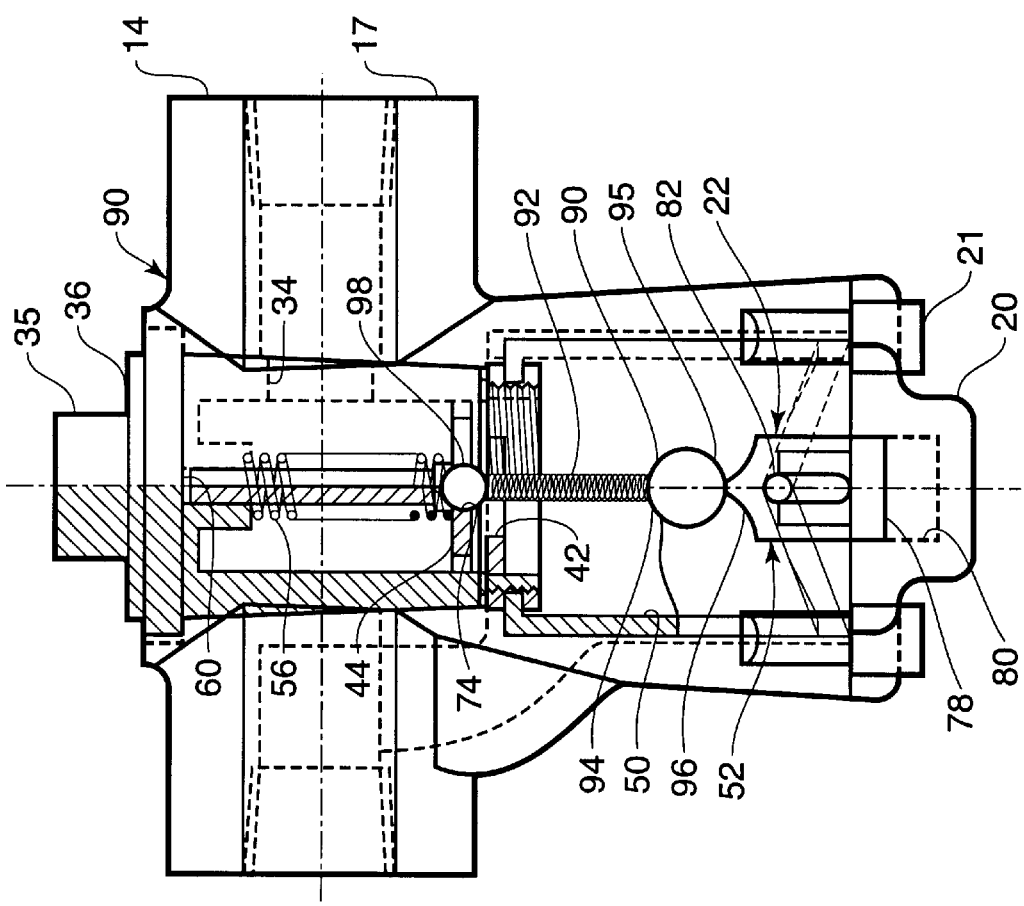
FIG. 3 is a cross sectional, side view of an alternate embodiment of the resettable earthquake valve of this invention.

In the alternate embodiment shown in FIG. 3, a resettable earthquake valve, designated by the reference numeral 90, is shown with identical elements to the embodiment of FIGS. 1 and 2 with the exception of the support spring 54 and a part of the pedestal mechanism 52.

The support spring 54 is replaced by a rigid pendulum member 92 having a weighted end ball 94 that seats on a support base in the form of a pedestal tee 96. The pendulum member 92 forms the prop for the value disk 44. The opposite end of the pendulum member 92 has a pivot ball 98 that engages the ball socket 74 of the value disk 44 allowing unidirectional lateral motion of the weighted distal end 95 of the pendulum member 92 when the valve is abruptly displaced.

A lateral shock to the valve 10 displaces the end ball 94 from the support tee 96 and the compression spring 56 forces the valve disk 44 to its closure position blocking the opening 42. When the turn cock 35 is rotated, the cam cuff 50 is pivoted lowering the piston 78 in the recess 80 allowing the pendulum member to return to its vertical position. On returning the turn cock 35 to its open position, the end ball 94 reseats on the support tee 96 and lifts the valve disk 44 from the opening 42 allowing gas flow to proceed through the valve 10.

An additional alternate embodiment of the resettable earthquake valve is shown in FIGS. 4–9 and designated by the reference numeral 100. The resettable earthquake valve is similar in construction and operation to the valves 10 and 90 of FIGS. 1 and 3. The valve 100 has certain minor differences in configuration and construction for improved operation, however, corresponding elements utilize the common numbering of the prior embodiments.

The resettable earthquake valve or motion valve 100 includes the cast housing 12 with conventional threaded, pipe connectors 14 and 16 providing the intake passage 17 and the exit passage 19 for fluid passage through the valve 100 in substantially the same manner as previously described. The valve housing 12 has the bell portion 18 with the bell cap 20 and seal 23 with the cap 20 connected to the housing 12 by bolts 21. The bell portion 18 houses the mechanical actuation and reset mechanism 22, which in this embodiment includes a trip mechanism 102 mounted within a modified cam cuff 104.

The cam cuff 104 is connected to a tapered sleeve 106 having a side port 108 alignable with the intake passage 17 on rotation of the tapered sleeve 106 by torsion applied to the turn cock 110 on integral cap 112. The cap 112 has a viewing port 114 with a quartz viewing eye 116 having a seal 118 that is seated by a threaded valve stem guide 120.

The tapered sleeve 106 has an internal constricted valve port 122 in a valve seat 124 retained by a threaded retainer ring 126 threaded to the tapered end 128 of the sleeve 106. The valve port 122 co-operates with a valve disk 130 mounted to a valve stem 132 that is displaceable in a recess 133 in the valve stem guide 120. The distal end of the valve stem is hollowed to receive a small compression spring 134 and the stem 136 of an indicator button 138. The spring loaded indicator button 138 accommodates overshoot of the valve stem 132 when setting the trip mechanism 102 as subsequently described.

Figure 4:
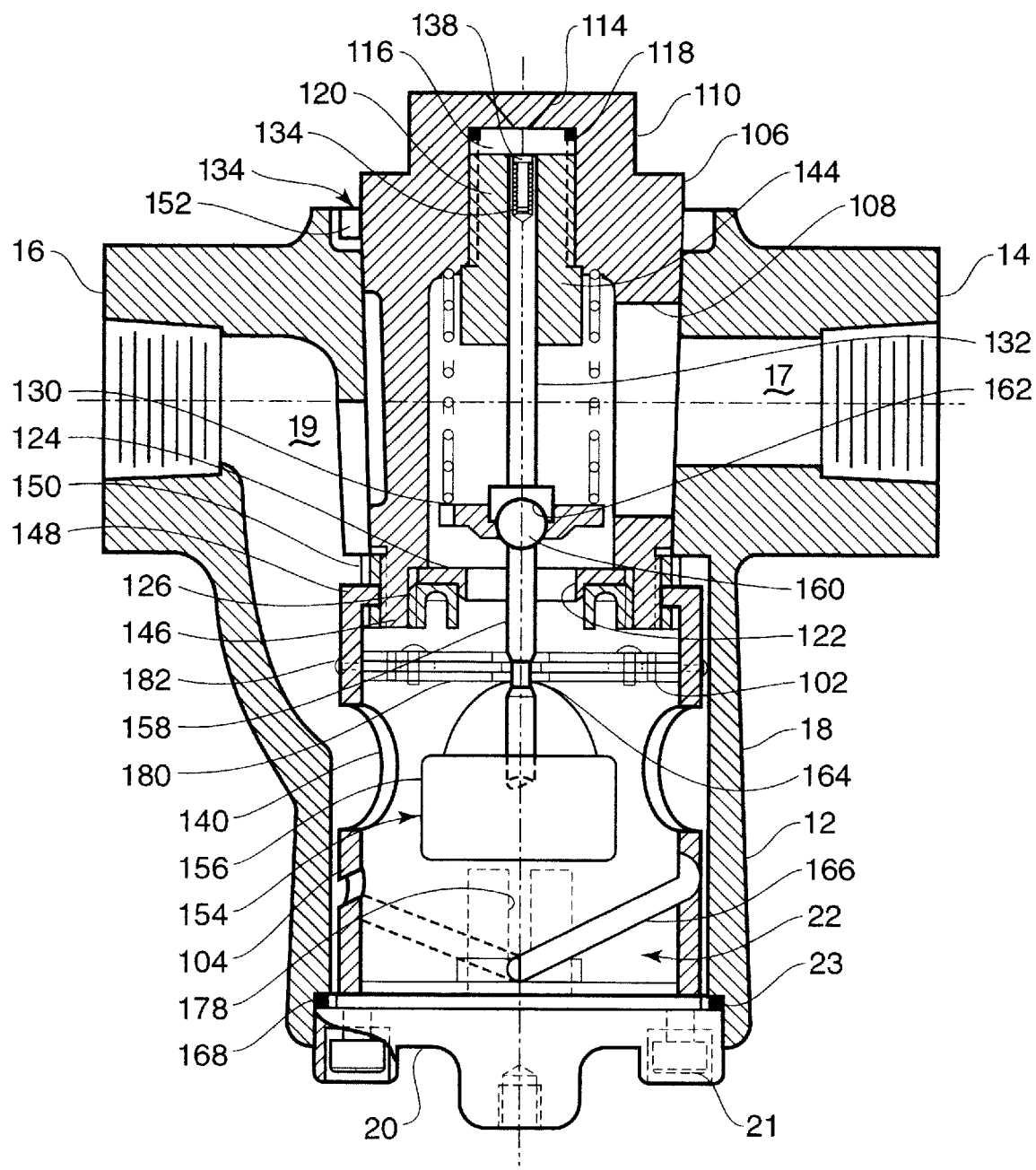
FIG. 4 is a cross-sectional view of another alternate embodiment of the resettable earthquake valve of this invention.

When the valve disk 130 is positioned in its open position as shown in FIG. 4, the indicator button is positioned at the viewing eye 116 indicating that the valve is set and fluid is able to flow from passage 17 through port 122 to the bell portion 18 of housing 12 to the connecting passageway 40 and exit passage 19 when side port 108 is aligned with passage 17. The cam cuff 104 has openings 140 to allow for unimpeded flow of fluid through the cuff.

In the set position, valve disk 130 compresses a compression spring 142 seated between the disk 130 and an internal shoulder 144 in the underside of the cap 112 of the tapered sleeve 106.

The compression spring 142 urges the disk 130 against the valve seat 124 when the motion valve 10 is triggered by a shock to the valve.

The mechanical actuation and reset mechanism 22 includes the cam cuff 104 which is connected to the tapered end 128 of the tapered sleeve 106 by a ring nut 146 which retains a lip 148 of the cuff 104 against a second ring nut 150. The second ring nut 150 engages the end of the tapered sleeve 106 and firmly retains the sleeve 106 in the housing 12 allowing limited axial pivot of the internal assembly by torque on the turn cock 110. Rotation is limited by a stop tab 152 to the quarter-plus turn needed to reset the trip mechanism or turn the side port 108 to a blocked position.

A pendulum assembly 154 includes a cylindrical inertia weight 156 on one end of a rod 158 having a pivot ball 160 at the other end for supporting the weight from a ball socket 162 in the valve disk 130. The rod 158 extends down through the valve port 122 to support the weight 156 in the bell portion 18 of the housing, allowing unidirectional lateral motion to the weight 156 when the valve is displaced.

Figure 5:
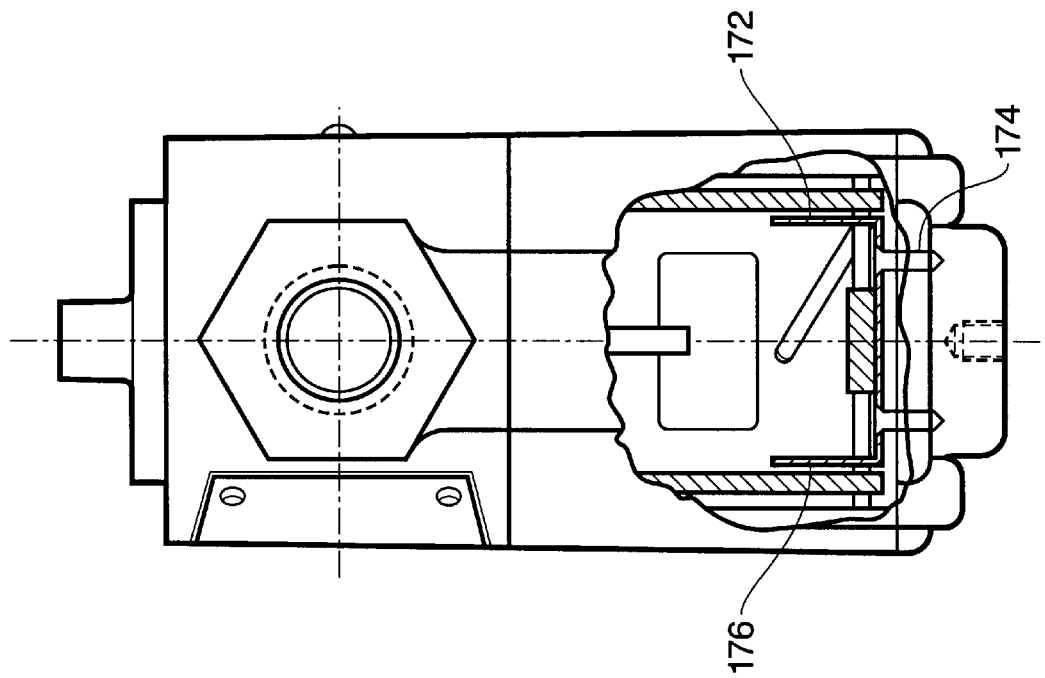
FIG. 5 is a side view, partially broken-away, of the earthquake valve of FIG. 4.

The rod 158 has a constricted portion 164 that is engaged by the trip mechanism 102 to prop the weight 156 and valve disk 130 in the elevated positions shown in FIGS. 4 and 5 against the bias of the compression spring 142. Upon sudden displacement of the motion valve 10, the trip mechanism 102 releases the engaged rod 150 allowing the weight 156 to fall as urged by the spring 142. The valve disk 130 seats on the valve seat 124 closing the valve port 122 and blocking fluid flow from intake passage 17 to exit passage 19.

To reset the motion valve 10, the turn cock 110 is rotated which rotates the cam cuff 104. The cam cuff 104 has opposed incline cam slots 166 that are engaged by the ends of a cross bar 168. The cross bar 168 as shown in FIG. 5 is connected to a support base in the form of a centrally located, lift pad 170.

The cross bar 168 is prevented from rotating with the cam cuff 104 on rotation of the cuff by a guide bracket 172 that is fixed to the end cap 20 by screws 174. The guide bracket 172 has ears 176 with guide slots 178 as shown in dotted line in FIG. 4.

The pendulum weight 156 drops to a position proximate the lift pad 170 on triggering of the motion valve 10. Rotation of the tapered sleeve 106 by the turn cock 110 rotates the cuff 104 causing the incline cam slots 166 to raise the cross bar and lift pad 170. The lift pad 170 in turn engages the bottom of the weight 156 and lifts the weight 156, displacing the pendulum rod 158 and the connected valve disk 130 against the compression spring 142. The trip mechanism 102 engages the constricted portion 164 of the rod 158 and retains the pendulum assembly when the lift pad 170 is lowered by reverse rotation of the tapered sleeve 106. In this manner, the operation of the cam cuff 104 differs from its operation in the previously described embodiments, where the lift element is not returned to a lowered position during reset of the motion valve.

Figure 6A:
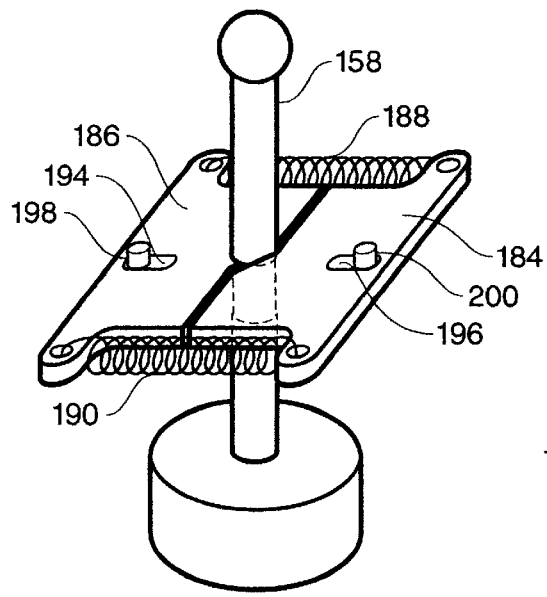
FIG. 6A is a perspective view of a portion of a pendulum assembly and trip mechanism in the earthquake valve of FIG. 4.
Figure 6B:
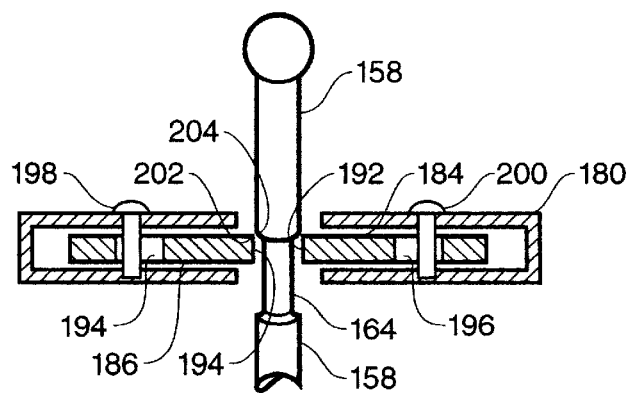
FIG. 6B is a partial cross-sectional view of the components of FIG. 6A with a casing.

The operation of the trip mechanism 102 is shown in FIGS. 6A and 6B, and 7A and 7B. The trip mechanism 102 includes an outer casing 180 mounted to the inside of the cam cuff 104 by small screws 182. Inside the casing 180 are the components forming the trip mechanism 102. Referring to FIGS. 6A and 6B the casing 180 contains a pair of trip plates 184 and 186 that are held together edge to edge by tension springs 188 and 190. The interfacing edge 192 of each trip plate has a "Z" configuration so that when in contact, a parallelogram or "diamond-shaped" opening is provided. This diamond-shaped opening is sized with the diameter of the constricted portion 164 of the rod 158 to allow a four-point contact of the two trip plates 184 and 186 with the constricted portion 164 of the rod 158. The trip plates 184 and 186 each have a slot 194 and 196 with a pin 198 and 200 fixed to the casing 180. This arrangement allows the trip plates 184 and 186 to be displaced away from the rod 158, but not toward the rod.

Figure 7A:
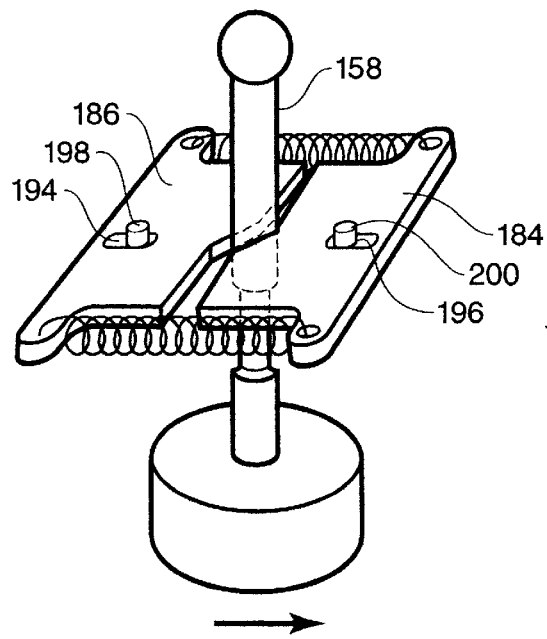
FIG. 7A is a perspective view of the portion of the pendulum assembly and trip mechanism of FIG. 6A in the course of being triggered.
Figure 7B:
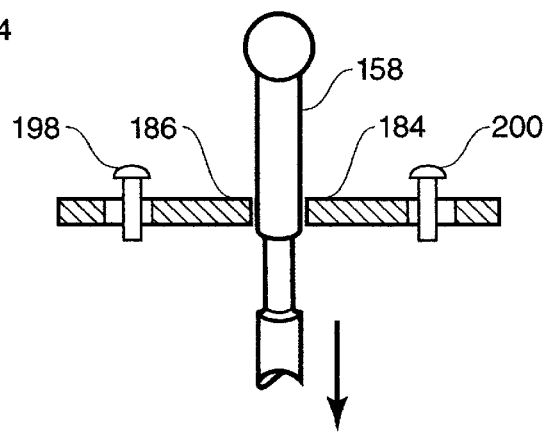
FIG. 7B is a partial cross-sectional view of the components of FIG. 7A.

In this manner, when motion of the pendulum weight 156, for example, as shown in FIGS. 7A and 7B, causes the rod 158 to displace the plate 184, plate 186 is prevented from following plate 184 by pin 198. The loss of contact with plate 186 causes the rod 158 to slip between the plates as shown in FIG. 7B, triggering the closure of the motion valve 10.

Preferably, the top corner 202 of the interfacing edge 192 of the trip plates is chamfered at a 30° angle from the horizontal. Similarly, the shoulder 204 of the constricted portion 164 of the rod 158 has a 30° angle. This lessens the potential effect of wear at the contact edges that may affect the performance predictability of the valve. The sensitivity of the valve to triggering is principally a factor of the stiffness of the tension springs with springs having a higher spring constant requiring a greater jolt to trigger the release of the weight and closure of the valve.

When the weight 156 of the pendulum assembly 154 is raised on resetting, the rod 158 slides in the diamond shaped opening with the slightly expanded trip plates biased against the rod by the springs 188 and 190. To insure that the plates 184 and 186 contract against the constricted portion 164 of the rod 158, the incline cam slots are designed to lift the pendulum assembly so that there is an overshoot of the constricted portion 164 relative to the plates 184 and 186. On return of the lift pad 170 to its lowered position, the shoulder 202 of the constricted portion seats at four points on the top corner 202 of the interfacing edges 192 of the two trip plates. Lateral motion from any direction will displace the pendulum weight and trip the shoulder 202 from the edge of one of the plates triggering the closure of the valve.

With the lowering of the pendulum assembly 154, the valve disk 130 and the valve stem 132, the indicator button 138 at the end of the valve stem 132 is displaced from the viewing eye 116 to signify the valve has been automatically tripped and requires resetting.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A resettable valve having an automatic shutoff actuated by an abrupt motion of the valve, comprising:
    a valve housing having a gaseous fluid intake passage and an exit passage;
    a valve sleeve in the housing having an external pivot means for pivoting the sleeve within the housing between a first position and a second position;
    an internal valve passage between the intake passage and the exit passage having a valve port;
    a displaceable valve disk in the housing and means for biasing the disk toward the valve port to block the port, and thereby block the internal valve passage;
    a triggerable support means connected to the valve disk for supporting the valve disk in a position displaced from the valve ports during normal operation of the valve, the support means having an inertial mass means for debilitating the support means from support of the valve disk on sudden motion of the valve, wherein upon sudden motion the support means is triggered and the displaceable valve disk is displaced toward the valve port and blocks the port; and
    an actuation and reset mechanism connected to the valve sleeve having a displaceable support base and actuation means for selectively displacing the support base toward and away from the valve port on pivot of the valve sleeve,
    wherein the support base is engageable with the support means and displaces the valve disk away from the valve port on resetting the valve after actuation by pivot of the valve sleeve with the external pivot means.

2. The resettable valve of claim 1 wherein the support means comprises a flexible post with a first end connected to the valve disk and second end connected to the displaceable support base, the flexible post having a central portion with the inertial mass means connected to the central portion of the flexible post.

3. The resettable valve of claim 2 wherein the flexible post comprises a tightly wound tension spring.

4. The resettable valve of claim 2 wherein the inertial mass means comprises a collar-like weight.

5. The resettable valve of claim 4 wherein the support base comprises a pedestal with a universal ball connection with the second end of the support member, and the valve disk has a universal ball connection with the first end of the support member.

6. The resettable valve of claim 1 wherein the support means comprises a pendulum member.

7. The resettable valve of claim 6 wherein the pendulum member is rigid with a weighted end in contact with the support base when the support base is displaced toward the valve port and the valve disk is displaced from the valve port during normal operation of the valve.

8. The resettable valve of claim 7 wherein the support base has a support tee and the weighted end of the pendulum member comprises a weighted ball that seats on the support tee when the valve is set and is displaced from the tee when the valve has been triggered.

9. The resettable valve of claim 1 wherein the external pivot means for pivoting the sleeve comprises a cap having a turn cock, the cap being integral with the sleeve.

10. The resettable valve of claim 9 wherein the valve disk has a valve stem and the valve sleeve has a valve stem guide with a recess into which the valve stem is displaceable, the valve stem having an end with a visual indicator and the cap having a viewing eye, the visual indicator being positioned at the viewing eye when the valve disk is displaced from the valve port thereby indicating the valve is set for normal operation.

11. The resettable valve of claim 1 wherein the housing has a bell portion and wherein the actuation and reset mechanism includes a cam cuff in the bell portion, the cam cuff being connected to the valve sleeve and pivotal therewith.

12. The resettable valve of claim 11 wherein the actuation and reset mechanism includes a cross bar on the displaceable support base engageable with opposed incline cam slots on the cam cuff and a fixed guide bracket in the housing for displacing the displaceable support base on pivot of the cam cuff.

13. The resettable valve of claim 1 wherein the means for biasing the disk comprises a compression spring.

14. The resettable valve of claim 1 wherein the valve disk has a valve stem, the housing having a cap with an internal recess, the valve stem being displaceable in the cap recess.

15. The resettable valve of claim 1 wherein the valve sleeve has a sleeve port that on a first position of the valve sleeve, is selectively alignable with the intake passage allowing fluid flow into the housing and on a second position of the sleeve, is displaced from the intake passage wherein the intake passage is selectively blocked.

16. The resettable valve of claim 1 wherein the triggerable support means connected to the valve disk and the actuation and reset mechanism cooperate to releaseably support the valve disk, wherein the triggerable support means includes a pendulum assembly with a rod having a first end with a pivot ball pivotally connected to the valve disk, a second end connected to the inertial mass means, and an intermediate portion with an engagement element, and wherein the actuation and reset mechanism includes a trip mechanism with engagement means for releasably engaging the engagement element on the rod of the pendulum assembly when the connected valve disk is displaced from the valve port.

17. The resettable valve of claim 15 wherein the engagement element comprises a constricted portion of the rod with a shoulder.

18. The resettable valve of claim 17 wherein the engagement means of the trip mechanism comprises a pair of opposed trip plates engageable with the shoulder and constricted portion of the rod.

19. The resettable valve of claim 18 including a pair of tension springs in the trip mechanism wherein the opposed trip plates have interfacing edges with a configuration forming a diamond-shaped opening through which the rod is inserted, the interfacing edges being biased toward each other by the tension springs.

20. The resettable valve of claim 19 wherein the trip mechanism includes a casing with a pair of pins, the trip plates each having a slot with one of the pins insertable in each slot, the pin and slot being arranged to limit displacement of the trip plates toward one another.

* * * * *